US006324186B1

(12) United States Patent
Mahn

(10) Patent No.: US 6,324,186 B1
(45) Date of Patent: Nov. 27, 2001

(54) PROCESS FOR DESIGNING A TRANSPORT DATA STREAM

(75) Inventor: Hendrick Mahn, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/180,001

(22) PCT Filed: Mar. 21, 1997

(86) PCT No.: PCT/DE97/00586

§ 371 Date: Jan. 26, 1999

§ 102(e) Date: Jan. 26, 1999

(87) PCT Pub. No.: WO97/41656

PCT Pub. Date: Nov. 6, 1997

(30) Foreign Application Priority Data

Apr. 30, 1996 (DE) .............................................. 196 17 293

(51) Int. Cl.[7] ........................................................ H04J 3/06

(52) U.S. Cl. ............................................................ 370/503

(58) Field of Search ..................................... 370/503, 324, 370/350, 349, 241, 254, 255, 395, 470, 476; 455/503; 375/354

(56) References Cited

U.S. PATENT DOCUMENTS 5,124,698 * 6/1992 Mustonen ........................ 340/825.44
5,218,717 6/1993 Reitberger .
5,220,676 6/1993 Logalbo et al. .
5,327,581 * 7/1994 Goldberg ............................ 455/503
5,995,554 * 11/1999 Lang .................................. 375/295

FOREIGN PATENT DOCUMENTS 96 12360 4/1996 (WO) .

OTHER PUBLICATIONS

G. Patri, ANT Nachrichtentechnische Berichte, vol. 6, Oct. 1, 1989, pp. 57–70*.
F. Furrer, "Fehlerkorrigierende Block–Codierung für die Datenübertragung", Birkhäuser–Verlag, Basel, 1981, pp. 52–53.**.

* cited by examiner

*Primary Examiner*—Huy D. Vu
*Assistant Examiner*—Alexander O. Boakye
(74) *Attorney, Agent, or Firm*—Kenyon & Kenyon

(57) ABSTRACT

To configure a transport data stream, in particular to synchronize transmitting stations in a common-wave network, data packets and additional packets are accommodated in a frame structure. The data rates of the data packets and additional packets are derived by division, for various predefined operating modes, from a feed data rate. The additional packets contain control data and synchronization data. This configuration of the transport data stream is suitable for the transmission of MPEG2 transport streams. An additional remote control system for the transmitting stations, and additional synchronization, can be dispensed with.

9 Claims, 1 Drawing Sheet

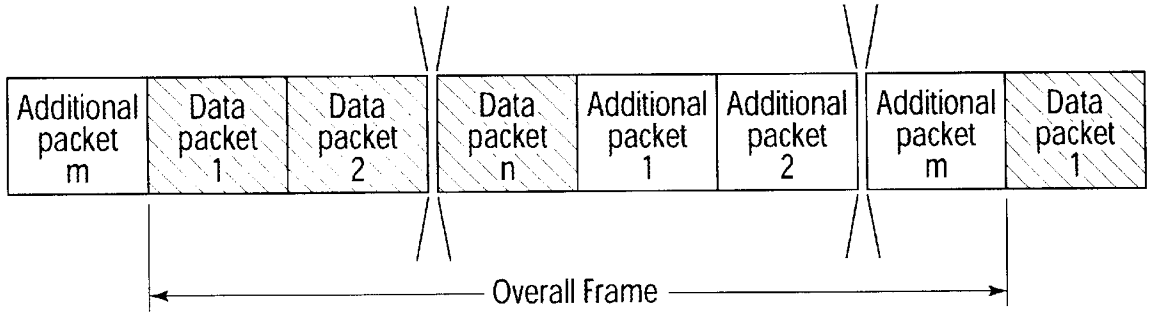

| Code | Emission mode | Data rate | Division | Data packet n | Additional packet m |
|---|---|---|---|---|---|
| 1 | 64DAPSK -Rate3/4 | 25776 kBit/s | 3/4 | 3 | 1 |
| 2 | 64DAPSK -Rate2/3 | 22912 kBit/s | 2/3 | 2 | 1 |
| 3 | 64DAPSK -Rate1/2 | 17184 kBit/s | 1/2 | 2 | 2 |
| 4 | 16DAPSK -Rate1 | 22912 kBit/s | 2/3 | 2 | 1 |
| 5 | 16DAPSK -Rate3/4 | 17184 kBit/s | 1/2 | 2 | 2 |
| 6 | 16DAPSK -Rate2/3 | 15274 kBit/s | 4/9 | 4 | 5 |
| 7 | 16DAPSK -Rate1/2 | 11456 kBit/s | 1/3 | 1 | 2 |
| 8 | DQPSK -Rate1 | 11456 kBit/s | 1/3 | 1 | 2 |
| 9 | DQPSK-Rate3/4 | 8592 kBit/s | 1/4 | 1 | 3 |
| A | DQPSK-Rate2/3 | 7637 kBit/s | 2/9 | 2 | 7 |
| B | DQPSK-Rate1/2 | 5728 kBit/s | 1/6 | 1 | 5 |
| C | TESTMODE | 4296 kBit/s | 1/8 | 1 | 7 |
| D | TESTMODE | 4296 kBit/s | 1/8 | 1 | 7 |
| E | TESTMODE | 4296 kBit/s | 1/8 | 1 | 7 |
| F | TESTMODE | 4296 kBit/s | 1/8 | 1 | 7 |

FIG. 1

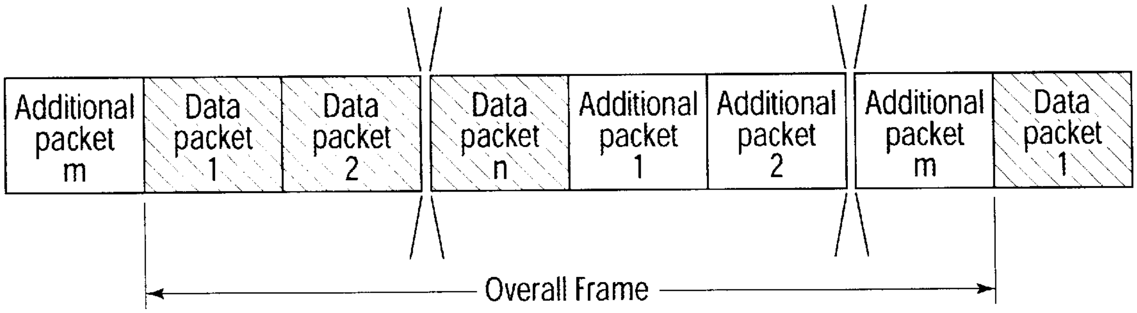

FIG. 2

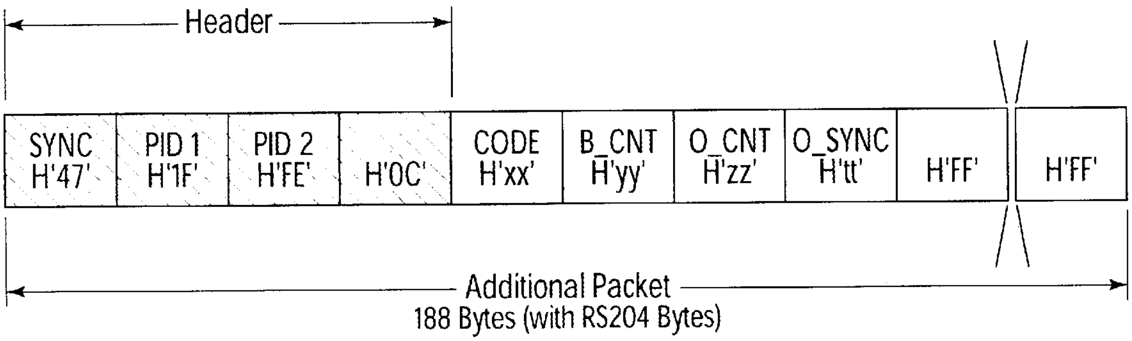

FIG. 3

PROCESS FOR DESIGNING A TRANSPORT DATA STREAM

BACKGROUND INFORMATION

In a method for synchronizing a telecommunications network described in International Patent Publication No. WO 96/12360, time marks for special transmission delays as well as a reference signal are incorporated into the transmitted multiplex signal. Each relative delay of the telecommunications network is locally compensated for. This method is suitable for the synchronization of SFN (single frequency network) transmission networks. Only one operating mode is possible therein, however. Only two additional packets are provided in the predefined frame structure.

Transmitting stations in common-wave networks must be synchronized in order to ensure correct operation. There are several concepts for automatic propagation-time compensation in common-wave networks see (ANT Nachrichtentechnische Berichte article, Vol. 6, October 1989, pp. 65–70):

The propagation times on the modulation lines are measured, and the propagation time difference is compensated for, by looping in additional delays, so as to maintain the phase condition;

The data signals to be emitted are transmitted via the modulation line to the transmitters, and are initially buffered there. Emission of the data is then initiated by a trigger signal, synchronously for all transmitters.

In the case of the latter method with buffering, the synchronization signal is critical for maintaining the phase condition. Dissemination of the synchronization signal cannot occur by transmission over the modulation lines, since the problem of different line propagation times exists here as well. All that thus remains is dissemination of the synchronization signal by radio. This requires an additional receiver at each transmitter location for the synchronization signal and possibly an additional separate transmitter for the synchronization signal. Additional hardware is moreover required in each transmitter, in the form of a FIFO memory.

Other conventional methods are based on derivation of the synchronization signal from a time signal transmitter, e.g. DCF77. The synchronicity achieved thereby can be attained, however, only with complex receivers which perform an analysis of the phase modulation of the standard time emission. When working, on the other hand, with the first-method in which the propagation times on the modulation lines are measured, the following procedure is a possibility and involves relatively little outlay: a bridge is connected at one end of the modulation line, advantageously at the transmitter. At the other end of the line, the total propagation time of the outgoing and return lines can then be measured with a suitable instrument.

This process is performed, for example, manually if a fixed compensation for line propagation times is to be accomplished by looping in additional delay devices. This method successful with transmitters which receive their modulation signals via physical four-wire lines. In the case of active transmission paths, however, considerable differences can occur in the propagation times of the outgoing and return lines. To eliminate this disadvantage, one possibility is to emit a modulation signal from the common star point of the transmitter network via one transmitter, and receive it again at the star point using a measurement receiver. It is thereby possible to ascertain the actual propagation time of the signal from the star point via the modulation line and the transmitter back to the star point. This can be done successively for each transmitter, and the propagation time differences ascertained in each case are brought up to a predefined final value by establishing additional delays.

In the "Cityruf" system, automatic propagation-time compensation is performed in a radio paging concentrator, and only the execution of the automatic propagation-time compensation is initiated by the radio paging exchange. From there, test sequences are transmitted via the transmitter network for synchronization purposes, and are received and analyzed in the radio paging concentrator. A microprocessor generates the necessary control telegrams, which trigger all connected transmitters in succession for the duration of the measurement telegrams. At the same time, synchronously with output of the measurement telegram, a time mark is generated. The emitted test sequences are received by a propagation-time receiver. After signal demodulation, the latter supplies an NRZ signal to a cycle and data regeneration circuit. Using the timing cycle that has been recovered in this fashion, the received data signal is read into a pattern recognizer which makes a comparison between the received data stream and the permanently stored content of the test sequence. As soon as a match has been detected, the pattern recognizer outputs a stop pulse.

An article ANT Nachrichtentechnische Berichte, Vol. 6, October 1989, pp. 57–64 discloses a frame structure for a transport data stream in a radio paging system, in which the transmitting stations are controlled by switching telegrams. In addition to data about operating modes and frequency control, a transport data stream of this kind contains synchronization words and data for automatic propagation-time compensation.

SUMMARY OF THE INVENTION

With a method according to the present invention, it is possible to achieve.

The features according to claim 1 make it possible to achieve a synchronization of transmitting stations, in particular of a simple matter, it is possible both to transfer the parameters for the emission to the transmitter itself, and to ensure exact synchronization of all the common-wave transmitters. As a result, an additional remote control system for the transmitting stations, and additional synchronization of the transmitters, can practically be dispensed with.

The configuration of the transport data stream as defined by the invention is suitable for the transmission of MPEG2 transport streams of various structures, and of other packet data streams which are accommodated in a transport data stream according to the invention. In particular, the transport data stream according to the present invention can be used for SFN (single-frequency network) feeder systems. The configuration of the transport data stream as defined by the invention guarantees that when a signal is distributed in a common-wave network to all transmitter locations of the common-wave network at the same time, the same signal can be made available synchronously in terms of timing and phase, and an additional control system, for example in the form of emission parameters for the common-wave network, can be largely dispensed with. Additional control data can be transmitted without major additional outlay. There is no need to transmit additional control data, e.g. GPS marks or fixed time signals, (e.g., as described in International Publication No. WO 96/12360). or to configure modem connections. An additional remote control system for the transmitting stations, and additional synchronization of the transmitters, can thus be omitted.

BRIEF DESCRIPTION OF THE DRAWINGS

FIG. 1 shows an example of parameters for various operating modes (e.g., emission modes).

FIG. 2 shows a configuration of an overall frame of a transport data stream according to the present invention.

FIG. 3 shows a configuration of additional packets.

DETAILED DESCRIPTION

The method according to the present invention is based on three sections building onto one another. The first section includes the structure of the transport stream packets. A number of different predefined operating modes (emission modes) are defined for terrestrial emission (common-wave network), the data rates of which can be derived by division from a predefined data rate, e.g. a feed data rate of 34.368 Mbit/sec. Division is accomplished in this connection via a common fraction. FIG. 1 shows examples of various emission modes—e.g. 64 DAPSK (differential amplitude spaceshift keying), 16 DAPSK, DQPSK (differential quaternary spaceshift keying)—with different code rates. The "code rate" referred to here is the number of data bits per block length (see Furrer, Fehlerkorrigierende Block-Codierung für die Datenübertragung, [Error-Correcting Block Coding for Data Transmission] Birkhäuser-Verlag, Basel, 1981, pp. 52 and 53). Also indicated, in addition to the emission mode, is the division factor from which the data rate can be derived by division from 34.368 Mbit/sec (feed data rate). Also depicted are the number of data packets n and additional packets m belonging to the emission mode. A code (first column) is also indicated for each emission mode.

The second section indicates the sequence and number of data packets and additional packets in the transport stream, and defines the positions at which the additional packets are located see (FIG. 2). The overall frame includes the number of packets in the denominator of the division factor. When an overall frame is sent, data packets are sent first, in a quantity equal to the value of the numerator of the division factor. Additional packets are then sent until the overall frame is filled with packets see (FIG. 2). Alternatively, the data packets and additional packets can also, for example, be nested alternately in among one another. This yields the number of data packets and additional packets indicated in the table of FIG. 1.

The third section defines the contents of the additional packets (bytes), and contains the actual control and synchronization data. The additional packets have the configuration depicted in FIG. 3. The meanings of the abbreviations used are as follows:

SYNC Synchronization data in H'. . . '

PID 1, 2 Program identifier (address)

CODE Code data (8 bits wide)

B_CNT Packet counter (8 bits wide)

O_CNT Overall frame counter (8 bits wide)

O_SYNC Synchronization for overall frame counter (8 bits wide)

The bytes depicted below are hexadecimal numbers H'. . . ; FF stands for the binary value B "1111 1111". It indicates currently that no data are contained in these bytes.

When an overall frame is sent out, the code data are transmitted in the first byte of the payload (after the header). In the transmitting station, it serves to select the cycle division ratio (which is in a direct relationship with the data rate (see FIG. 1: Division)), and to control the downstream modulator. When this byte H'XX' is received by a transmitting station, it sets the corresponding cycle divider (division cycle=feed frequency×division). The resulting frequency, however, is not phase-synchronized with the other transmitting stations. The second byte H'YY' provides cycle phase synchronization and data synchronization. It counts the packets of an overall frame, and in the last packet of the overall frame is equal to zero. Because of the length of the overall frame as a ratio of feed frequency to division frequency, at this point in time both frequencies are always in the same phase relationship to one another. This phase relationship is determined in each transmitting station (second byte=0), and the division frequency is shifted until a specific value for the phase relationship is reached. This phase relationship value is permanently defined for each emission mode. The signal propagation time of the feed network is previously equalized by way of a calibration operation of all the common-wave transmitters. This makes it possible to ensure that all the transmitting stations have a division frequency with the same frequency and phase relationship. Data synchronization is accomplished concurrently with cycle phase synchronization. When the division frequency and cycle phases have been set, data synchronization is performed, after the next synchronization byte (second byte=0), by writing all the data packets into a buffer and beginning data output to the modulator with the subsequent synchronization byte. Since the number of valid data bytes supplied by the feed in one synchronization frame is exactly equal to the number emitted by the modulator, two modulators operating independently of one another (and which were initiated at different times) send out the same data at the same time with the same frequency and phase relationship (common-wave mode).

Other control, status, or synchronization data can be transmitted in the remaining bytes, e.g. a frame synchronization for differential transmission systems. The method according to the present invention is also suitable, for example, for transmitting QFSK, QAM, and/or OFDM signals.

What is claimed is:

1. A method for configuring a transport data stream for synchronizing transmitting stations of a network, the transport data stream including first data packets and second data packets, the first data packets and the second data packets being provided in an overall frame, the second data packets including control data, synchronization data and operating data, the operating data indicating predetermined operating modes, the method comprising the steps of:

deriving, by a division procedure, a first data rate of the first data packets and a second data rate of the second data packets for the predetermined operating modes as a function of a predetermined feed data rate, the division procedure dividing a first number of the first data packets or the second data packets by a second number of the first data packets or the second data packets of the overall frame, the division procedure providing a division ratio;

determining a third number of the first data packets and the second data packets in the transport data stream as a function of the division ratio;

performing one of the following steps:

(a) providing the first data packets in at least one predetermined position in the overall frame, and, after the first data packets are provided in the overall frame, providing a predetermined number of the second data packets in the overall frame until the overall frame is filled, and (b) providing the first data packets and the second data packets in the overall frame, one of the first and second data packets provided in another one of the first and second data packets;

providing a first data block into the second data packets, the first data block being at least one of:

a first datum for selecting the division ratio, and a second datum for performing at least one of a cycle phase synchronization and a data synchronization;

determining phase relationship data in at least one of the transmitting stations; and shifting the phase relationship data until a predetermined value of a phase position is reached to provide a predetermined division frequency for the transmitting stations in which frequency relationship data and the phase relationship data are substantially the same in all of the transmitting stations.

2. The method according to claim 1, further comprising the step of:

providing second data blocks and at least one of the control data, the operating data and the synchronization data into the second data packets.

3. The method according to claim 2, further comprising the step of:

providing third data blocks into the second data packets to synchronize frames of a differential transmission system.

4. The method according to claim 3, further comprising the step of:

receiving the first data block in at least one of the transmitting stations; and establishing a corresponding cycle divider as a function of the first data block received in the transmitting station, the first data block indicating a particular data rate of the predetermined operating modes.

5. The method according to claim 4, further comprising the steps of:

after the shifting step and after the second datum is received in the overall frame, recording the first and second data packets into a buffer; and when a further synchronization datum is received, outputting the first and second data packets for an emission procedure and providing the first and second data packets to a corresponding modulator to be in a transmission mode of the predetermined operating modes.

6. The method according to claim 4, wherein the first data block includes the first datum.

7. The method according to claim 1, wherein the transport stream includes at least one of an audio transport stream, a video transport stream and the data transport stream.

8. The method according to claim 1, wherein the method enables a transmission of at least one of a differential data stream, a DAPSK signal, a DQPSK signal, a QPSK signal, a QAM signal and a OFDM signal having a varying error protection.

9. The method according to claim 1, wherein the transmitting stations include single frequency network (SFN) feeder systems.

* * * * *

UNITED STATES PATENT AND TRADEMARK OFFICE

CERTIFICATE OF CORRECTION

PATENT NO. : 6,324,186 B1

DATED : November 27, 2001

INVENTOR(S) : Hendrick Mahn

It is certified that error appears in the above-identified patent and that said Letters Patent is hereby corrected as shown below:

Column 1,
Line 19, change "see (ANT" to -- (see ANT --
Line 46, change "first-method" to -- first method --
Line 56, change "method successful" to -- method was successful --

Column 2,
Line 33, change "achieve." to -- achieve --
Line 34, delete "The features according to claim 1 make it possible to achieve"
Line 36, change "in particular of a simple matter," to -- in particular of transmitting statims in a terrestrial common-wave network, in a simple manner.
With this method, --
Line 60, change "WO96/12360)." to -- WO96/12360), --

Column 3,
Line 20, change "(see Furrer" to -- (see F.G. Furrer --
Line 21, change "Datenübertragung," to -- Datenübertragung --
Line 22, change "Transmission]" to -- Transmission], --
Line 37, change "see (FIG. 2) to -- (see FIG. 2) --

Signed and Sealed this

Thirty-first Day of December, 2002

JAMES E. ROGAN

*Director of the United States Patent and Trademark Office*